United States Patent
Nohr et al.

(10) Patent No.: US 6,399,769 B1
(45) Date of Patent: *Jun. 4, 2002

(54) METHOD OF MAKING SULFANATOPHENYL SUBSTITUTED PORPHINES

(75) Inventors: Ronald S. Nohr, Alpharetta; J. Gavin MacDonald, Decatur, both of GA (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,229

(22) Filed: Dec. 11, 1998

Related U.S. Application Data

(60) Provisional application No. 60/071,937, filed on Jan. 20, 1998.

(51) Int. Cl.⁷ .............................................. C07D 487/22
(52) U.S. Cl. ....................................................... 540/145
(58) Field of Search ........................ 540/145; 430/106; 106/20 R

(56) References Cited

U.S. PATENT DOCUMENTS

| | | | | |
|---|---|---|---|---|
| 5,597,405 A | * | 1/1997 | Grigoryan et al. | 106/20 R |
| 5,782,963 A | | 7/1998 | Nohr et al. | |
| 5,855,655 A | | 1/1999 | Nohr et al. | |
| 5,876,989 A | * | 3/1999 | Berg et al. | 435/173.7 |
| 5,891,229 A | | 4/1999 | Nohr et al. | |

FOREIGN PATENT DOCUMENTS

| | | |
|---|---|---|
| WO | 95/29916 | 11/1995 |
| WO | 98/23695 | 6/1998 |

OTHER PUBLICATIONS

Metalloporphyrins; edit by Sheldon; Marcel Dekker, Inc., 1994; Chap. 7.*
Beck et al., Chem. Abst. 1985: 453624.*
Ding, Chemical Abstract accession No. 113:211677, 1990.*
Kubát et al Photochem. Photobio. A: Chemistry 96 (1996) 93–97.*
Wang, Lihing et al., "Effects of Substituents attached at benzaldehyde on the synthesis and properties of porphyrins," Chemical Abstracts, vol. 120, No. 5 (Jan. 31, 1994).
Zhang, Zhoupeng et al., "Synthesis of 7 meso–tetrasubstituted porphyrins," Chemical Abstracts, vol. 113 (Mar. 27, 1990).

* cited by examiner

Primary Examiner—Mukund J. Shah
Assistant Examiner—Thomas McKenzie
(74) Attorney, Agent, or Firm—Kilpatrick Stockton LLP

(57) ABSTRACT

The present invention relates to improved methods of making Cu-meso-tetra-(4-sulfanatophenyl)-porphine (designated p-CuTPPS4). The improved processes allow the production of p-CuTPPS4 at lower cost and higher yields compared to conventional methods of making p-CuTPPS4. The present invention further relates to methods of making Cu-meso-tetra-(2-sulfanatophenyl)-porphine (designated o-CuTPPS4) and the use of o-CuTPPS4 as a colorant stabilizer for a variety of colorants, especially magenta colorants. The o-CuTPPS4, according to the present invention, provides a more stable and more "blue" colorant stabilizer compared to known colorant stabilizers, such as Cu-meso-tetra-(p-phenylcarboxylic acid)-porphine.

28 Claims, No Drawings

METHOD OF MAKING SULFANATOPHENYL SUBSTITUTED PORPHINES

CROSS REFERENCE TO RELATED APPLICATION

This application claims priority to U.S. Provisional Application No. 60/071,937, filed Jan. 20, 1998, the entirety of which is incorporated herein by reference.

TECHNICAL FIELD

The present invention relates to an improved method for making 5,10,15,20-tetraphenyl-21H,23H-porphine-p-$p^1$,$p^{11}$, $p^{111}$-tetrasulfonic acid, tetrasodium salt (designated p-TPPS4). The present invention is also directed to a method of making Cu-meso-tetra-(4-sulfanatophenyl)-porphine (designated p-CuTPPS4) from p-TPPS4. The improved process allows the production of p-CuTPPS4 at lower cost and higher yields compared to conventional methods of making p-CuTPPS4. The present invention further relates to a method of making 5,10,15,20-tetraphenyl-21H,23H-porphine-o,$o^1$,$o^{11}$,$o^{111}$-tetrasulfonic acid, tetrasodium salt (designated p-TPPS4). The present invention is further directed to a method of making Cu-meso-tetra-(2-sulfanatophenyl)-porphine (designated o-CuTPPS4) from o-TPPS4 and the use of o-CuTPPS4 as a colorant stabilizer for a variety of colorants, especially magenta colorants. The o-CuTPPS4, according to the present invention, provides a more stable and more "blue" colorant stabilizer compared to known colorant stabilizers, such as Cu-meso-tetra-(p-phenylcarboxylic acid)-porphine.

BACKGROUND OF THE INVENTION

U.S. patent applications Ser. No. 08/757,222 filed Nov. 27, 1996; Ser. No. 08/788,863 filed Jan. 23, 1997; Ser. No. 08/843,410 filed Apr. 15, 1997; Ser. No. 08/903,911 filed Jul. 31, 1997; Ser. No. 60/055,785 filed Aug. 15, 1997; and Ser. No. 60/062,643 filed Oct. 22, 1997, all of which are assigned to Kimberly Clark Worldwide, Inc., disclose the use of a variety of porphines as colorant stabilizers. Porphines disclosed in the above-referenced applications include, but are not limited to, porphines having the following general structure:

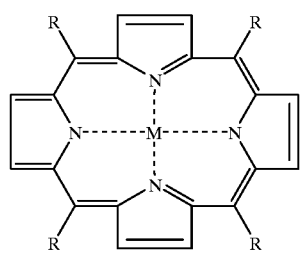

wherein R is any proton-donating moiety and M is iron, cobalt or copper. Desirably, R is $SO_3H$,

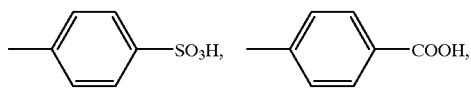

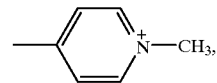

COOH, or $R_1COOH$ wherein $R_1$ is an alkyl group of from 1 to 6 carbons. R may also be in its corresponding

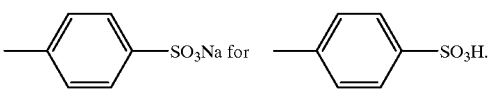

One such porphine is Cu-meso-tetra-(4-sulfanatophenyl)-porphine (designated p-CuTPPS4) having the following structure:

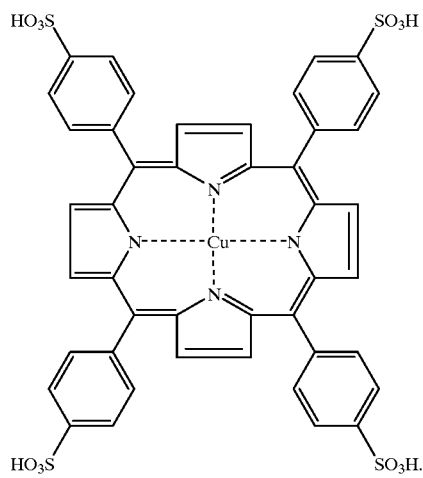

Conventional methods of making p-CuTPPS4 involve the following three-step process:

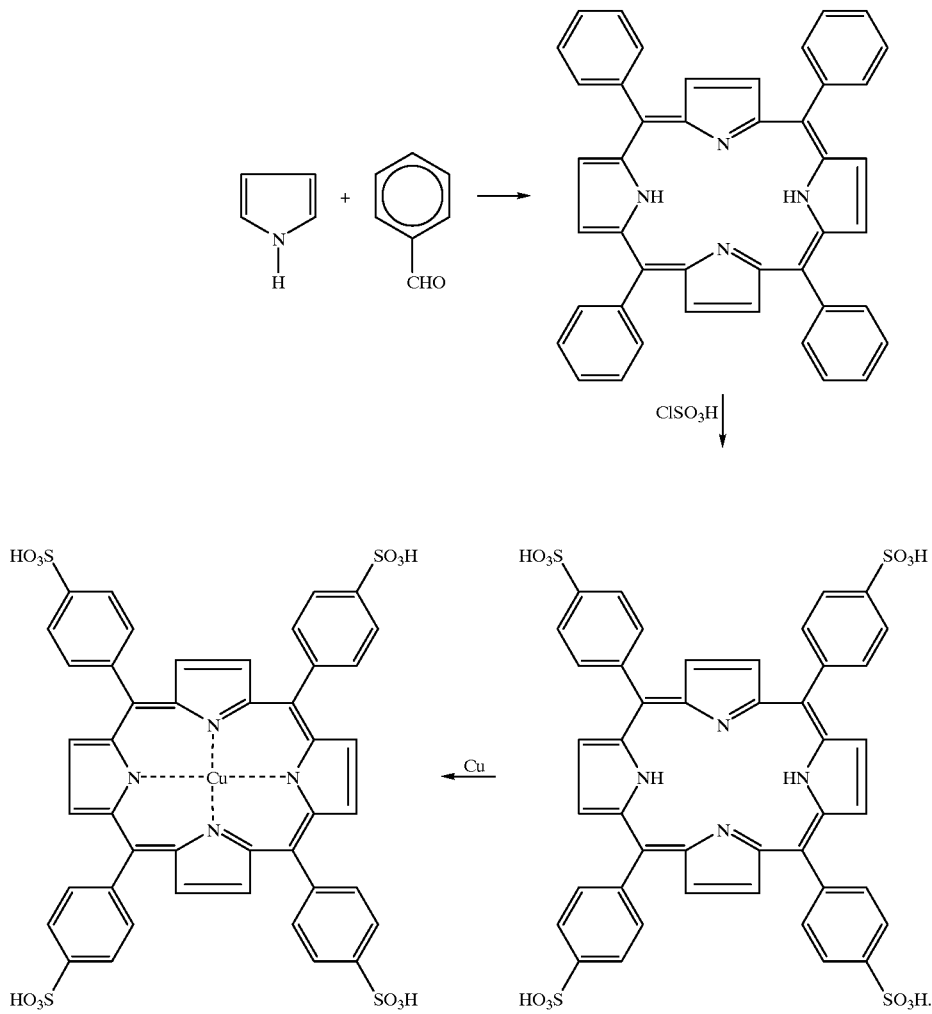

The yield of p-CuTPPS4 in the above process is only about 10%. In addition, the resulting product comprises a mixture of porphine molecules containing from one to four sulfonic acid groups per molecule.

An attempt to make o-CuTPPS4 is disclosed in Treibs et al., *Leibigs Ann. Chem.*, 718, 183, 1998 (hereafter, "Treibs"). Treibs tried to prepare o-TPPS4 from 2-formylbenzenesulfonic acid, pyrrole, and propionoic acid. However, Treibs could not isolate the resulting product. Treibs reported a yield by GLC analysis of less than about 10%.

Although porphines provide excellent light stability to all colorants, some porphines are relatively unstable and/or tend to "yellow" colorant compositions containing magenta dyes. A more desirable porphine molecule would be one that has less tendency to "yellow" a colorant composition, and moreover, to make the colorant composition more "blue."

Therefore, there exists a need in the art for a convenient, low cost, high yield method of making p-TPPS4, p-CuTPPS4, and compositions containing p-CuTPPS4. There also exists a need in the art for a convenient, low cost, high yield method of making o-TPPS4, o-CuTPPS4, and compositions containing o-CuTPPS4. Further, there exists a need for improved porphines which are capable of providing superior colorant stability while being more stable and without the tendency to "yellow" colorant compositions containing magenta dyes.

SUMMARY OF THE INVENTION

The present invention addresses the needs described above by providing processes of making p-TPPS4 and o-TPPS4 at a lower cost and higher yields. The present invention also relates to processes of making Cu-meso-tetra-(4-sulfanatophenyl)-porphine (designated p-CuTPPS4) and Cu-meso-tetra-(2-sulfanatophenyl)-porphine (designated o-CuTPPS4), and the use of p-CuTPPS4 and o-CuTPPS4 as colorant stabilizers for a variety of colorants, especially magenta colorants. o-CuTPPS4 has excellent stability and provides superior stability to a variety of colorants. Moreover, o-CuTPPS4 does not "yellow" magenta dyes. Consequently, less unstable dye, such as Acid Red 52, needs to be used to make a magenta composition more "blue." The result is a more "blue" magenta color and a higher porphine to dye ratio, which creates superior light stability.

The present invention also relates to colorant compositions having improved stability, wherein the colorant is associated with p-CuTPPS4 and/or o-CuTPPS4. These and other features and advantages of the present invention will become apparent after a review of the following detailed description of the disclosed embodiments and the appended claims.

DETAILED DESCRIPTION OF THE INVENTION

The present invention is directed to a convenient, fast, low cost, environmental-friendly process of making p-CuTPPS4 and o-CuTPPS4. One. process of making p-CuTPPS4 proceeds by the following reaction:

a p-CuTPPS4 having a reduction in the cost of manufacture of approximately 50%.

The reaction conditions for the above process may vary. Typically, the reaction is carried out as follows. The reactants are mixed at room temperature. The mixture is then heated, while stirring, under reflux for about one hour. A precipitate forms during the reaction. The reaction mixture is then filtered while hot to obtain the desired p-CuTPPS4. The solid is washed with hot solvent to yield a pure product.

The choice of solvent in the above process may be any aliphatic acid having from one to six carbon atoms in the carbon chain. Suitable acids include, but are not limited to, acetic acid, propanoic acid, butanoic acid, pentanoic acid, hexanoic acid, formic acid, and mixtures thereof.

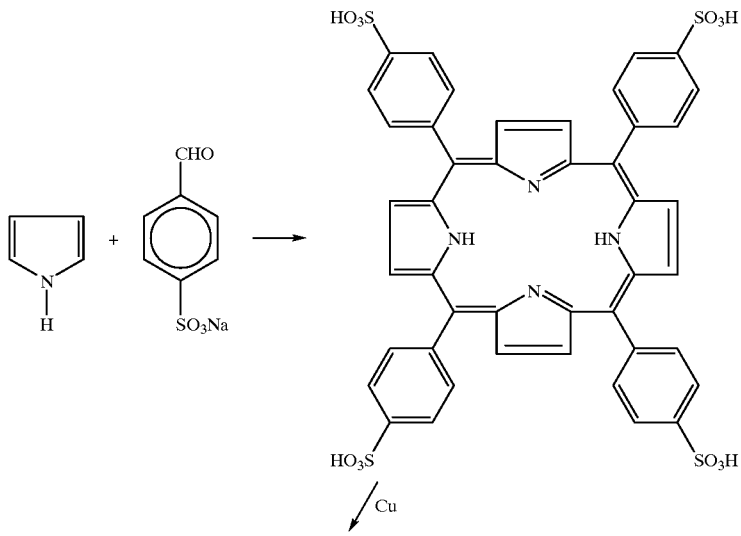

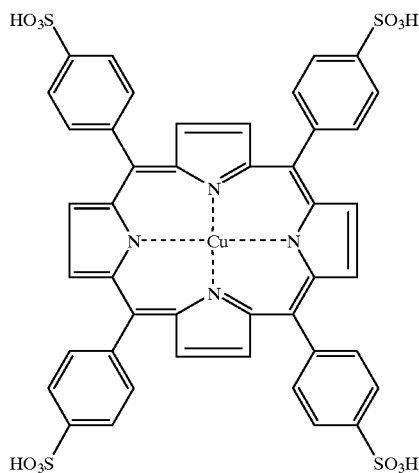

The above process produces p-CuTPPS4 at yields of about 45% compared to conventional methods of producing p-CuTPPS4, which have yields of about 20%. The result is The present invention is also directed to a process of making Cu-meso-tetra-(2-sulfanatophenyl)-porphine (designated o-CuTPPS4). The process of making o-CuTPPS4 proceeds by the following reaction:

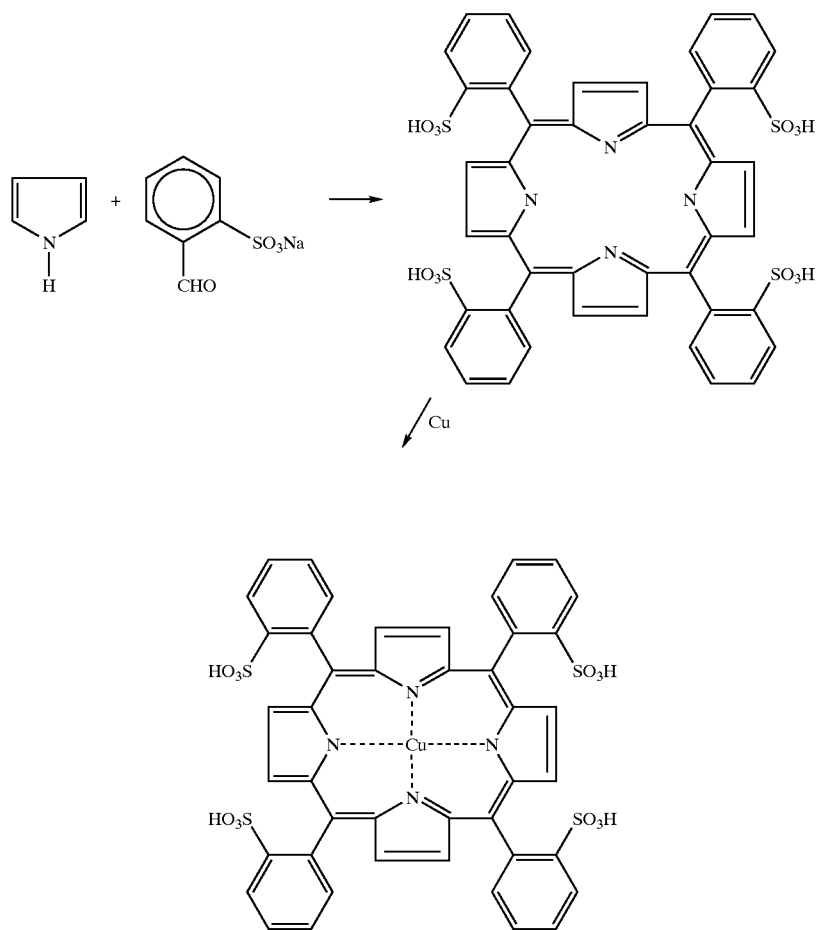

The above process produces o-CuTPPS4 at yields of about 55%. The resulting o-CuTPPS4 has excellent stability and provides superior stability to a variety of colorants. Moreover, the o-CuTPPS4 does not "yellow" magenta dyes. Magenta compositions containing the o-CuTPPS4 result in a more "blue" magenta color.

The present invention is further directed to a process of making o-TPPS4 and o-CuTPPS4 by the following reaction:

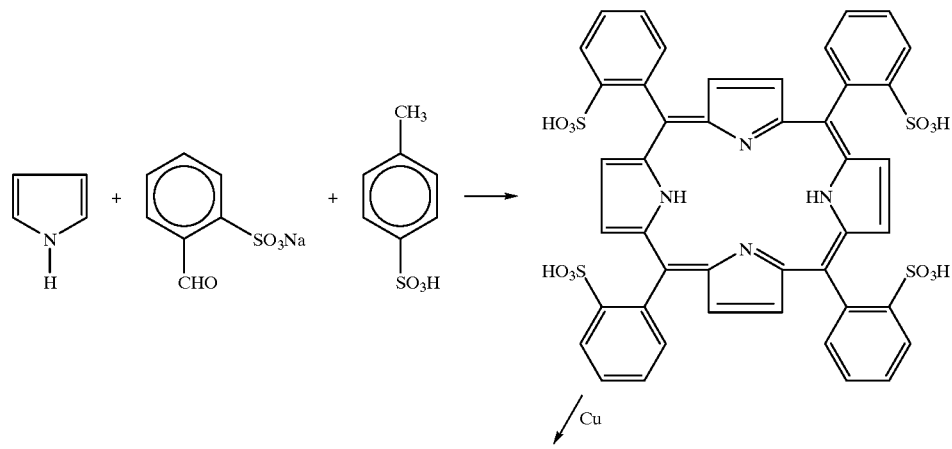

-continued

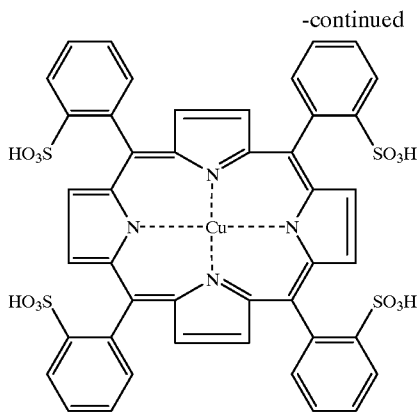

The above process produces o-TPPS4 at yields of about 82%.

The reaction conditions for the above process may vary. Typically, the reaction may be carried out as follows. The reactants are purified by the following process or a similar purification process. The pyrrole is distilled under argon and a fraction is collected at 140° C. The 2-formylbenzenesulfonic acid, sodium salt is purified by a Dean and Stark method using benzene as the solvent. The solution is filtered at 60° C. and the solid pumped in a vacuum oven overnight at room-temperature. The p-toluene sulfonic acid may also be purified by a Dean and Stark method using benzene as the solvent.

The 2-formylbenzenesulfonic acid, sodium salt, N,N-dimethylformamide (DMF) and pyrrole are placed in a reaction vessel and stirred at room-temperature. The mixture is flushed with argon for about five minutes while stirring prior to heating. The mixture is then heated to 100° C. for about ten to twelve minutes. The toluene sulfonic acid dissolved in 15 ml of DMF is injected into the reaction mixture. The reaction mixture is heated to 150° C. and held at this temperature for about 50 minutes. The reaction mixture is then cooled in an ice bath for about 20 minutes and then poured into 1000 ml of benzene and stirred at room-temperature for about 10 minutes. The precipitate is filtered using a Buchner funnel and dried to produce a solid. The solid is then stirred in 500 ml of ethanol for about 30 minutes and filtered. The wet solid is pumped in a vacuum oven for about three hours to yield a finished product.

The choice of solvent in the above process may be any solvent, which enables the efficient production of o-TPPS4 and o-CuTPPS4. Suitable solvents include, but are not limited to, DMF and dimethyl sulfoxide (DMSO).

The present invention also relates to colorant compositions having improved stability, wherein the colorant is associated with p-CuTPPS4 and/or o-CuTPPS4. Desirably, one or more of the above-mentioned colorant stabilizers are admixed with a colorant solution. The colorant stabilizer may be one or more porphines alone or in combination with at least one metal or metal salt. Optionally, the colorant stabilizer may be associated with a molecular includant, chelating agent, or other material to improve solubility and/or interaction of the colorant stabilizer and the colorant.

The p-CuTPPS4 and/or o-CuTPPS4 colorant stabilizers may be associated with a variety of dyes or colorants. A suitable dye or colorant, for example, may be an organic dye. Organic dye classes include, by way of illustration only, triarylmethyl dyes, such as Malachite Green Carbinol base {4-(dimethylamino)-__-[4-(dimethylamino)phenyl]-__-phenyl-benzene-methanol}, Malachite Green Carbinol hydrochloride {N-4-[[4-(dimethylamino)phenyl]phenyl-methylene]-2,5-cyclohexyldien-1-ylidene]-N-methyl-methanaminium chloride or bis[p-(dimethylamino)phenyl] phenylmethylium chloride}, and Malachite Green oxalate {N-4-[[4-(dimethylamino)-phenyl]-phenylmethylene]-2,5-cyclohexyldien-1-ylidene]-N-methyl-methanaminium chloride or bis[p-(dimethyl-amino)-phenyl]phenylmethylium oxalate}; monoazo dyes, such as Cyanine Black, Chrysoidine [Basic Orange 2; 4-(phenylazo)-1,3-benzenediamine monohydrochloride], Victoria Pure Blue BO, Victoria Pure Blue B, basic fuschin and β-Naphthol Orange; thiazine dyes, such as Methylene Green, zinc chloride double salt [3,7-bis (dimethylamino)-6-nitrophenothiazin-5-ium chloride, zinc chloride double salt]; oxazine dyes, such as Lumichrome (7,8-dimethylalloxazine); naphthalimide dyes, such as Lucifer Yellow CH {6-amino-2-[(hydrazino-carbonyl)amino]-2, 3-dihydro-1,3-dioxo-1H-benz[de]iso-quinoline-5,8-disulfonic acid dilithium salt}; azine dyes, such as Janus Green B {3-(diethylamino)-7-[[4-(dimethyl-amino)phenyl] azo]-5-phenylphenazinium chloride}; cyanine dyes, such as Indocyanine Green (Cardio-Green or Fox Green; 2-[7-[1,3-dihydro-1,1-dimethyl-3-(4-sulfobutyl)-2H-benz[e]indol-2-ylidene]-1,3,5-heptatrienyl]-1,1-dimethyl-3-(4-sulfobutyl)-1H-benz[e]indolium hydroxide inner salt sodium salt}; indigo dyes, such as Indigo {Indigo Blue or Vat Blue 1; 2-(1,3-dihydro-3-oxo-2H-indol-2-ylidene)-1,2-dihydro-3H-indol-3-one}; coumarin dyes, such as 7-hydroxy-4-methyl-coumarin (4-methylumbelliferone); benzimidazole dyes, such as Hoechst 33258 [bisbenzimide or 2-(4-hydroxyphenyl)-5-(4-methyl-1-piperazinyl)-2,5-bi-1H-benzimidazole trihydro-chloride pentahydrate]; paraquinoidal dyes, such as Hematoxylin {Natural Black 1; 7,11b-dihydrobenz[b]-indeno[1,2-d]pyran-3,4,6a,9,10(6H)-pentol}; fluorescein dyes, such as Fluoresceinamine (5-aminofluorescein); diazonium salt dyes, such as Diazo Red RC (Azoic Diazo No. 10 or Fast Red RC salt; 2-methoxy-5-chlorobenzenediazonium chloride, zinc chloride double salt); azoic diazo dyes, such as Fast Blue BB salt (Azoic Diazo No. 20; 4-benzoylamino-2,5-diethoxy-benzene diazonium chloride, zinc chloride double salt); phenylenediamine dyes, such as Disperse Yellow 9 [N-(2, 4-dinitrophenyl)-1,4-phenylenediamine or Solvent Orange 53]; diazo dyes, such as Disperse Orange 13 [Solvent Orange 52; 1-phenylazo-4-(4-hydroxyphenylazo) naphthalene]; anthra-quinone dyes, such as Disperse Blue 3 [Celliton Fast Blue FFR; 1-methylamino-4-(2-hydroxyethylamino)-9,10-anthraquinone], Disperse Blue 14 [Celliton Fast Blue B; 1,4-bis(methylamino)-9,10- anthraquinone], and Alizarin Blue Black B (Mordant Black 13); trisazo dyes, such as Direct Blue 71 {Benzo Light Blue FFL or Sirius Light Blue BRR; 3-[(4-[(4-[(6-amino-1-hydroxy-3-sulfo-2-naphthalenyl)azo]-6-sulfo-1-naphthalenyl)-azo]-1-naphthalenyl)azo]-1,5-naphthalenedisulfonic acid tetrasodium salt}; xanthene dyes, such as 2,7-dichloro-fluorescein; proflavine dyes, such as 3,6-diaminoacridine hemisulfate (Proflavine); sulfonaphthalein dyes, such as Cresol Red (o-cresolsulfonaphthalein); phthalocyanine dyes, such as Copper Phthalocyanine {Pigment Blue 15; (SP-4-1)-[29H,31H-phthalocyanato(2-)-$N^{29}$, $N^{30}$,$N^{31}$,$N^{32}$]-copper}; carotenoid dyes, such as trans-β-carotene (Food Orange 5); carminic acid dyes, such as Carmine, the aluminum or calcium-aluminum lake of carminic acid (7-a-D-glucopyranosyl-9,10-dihydro-3,5,6,8-tetrahydroxy-1-methyl-9,10-dioxo-2-anthracene-carbonylic acid); azure dyes, such as Azure A [3-amino-7-(dimethylamino)phenothiazin-5-ium chloride or 7-(dimethyl-amino)-3-imino-3H-phenothiazine hydrochloride]; and acridine dyes, such as Acridine Orange [Basic Orange 14; 3,8-bis(dimethylamino)acridine hydrochloride, zinc chloride double salt] and Acriflavine (Acriflavine neutral; 3,6-diamino-10-methylacridinium chloride mixture with 3,6-acridine-diamine).

The present invention is further described by the examples which follow. Such examples, however, are not to be construed as limiting in any way either the spirit or scope of the present invention. In the examples, all parts are parts by weight unless stated otherwise.

EXAMPLE 1

Preparation of p-TPPS4

Tetra-(4-sulfanatophenyl)-porphine (designated p-TPPS4) was prepared by the following reaction. A mixture of 5 g of pyrrole, 15.5 g of the sodium salt of p-benzalsulfonic acid and 150 ml of acetic acid were added to a 250 ml round bottom flask fitted with a condenser and magnetic stirrer bar. The mixture was heated and refluxed for one hour. The mixture was filtered hot to yield 10.1 g of a red/brown solid. The solid was washed with hot solvent to yield a pure product.

Thin layer chromatography (TLC) using methanol showed a clean product, which had an identical Rf value as an authentic sample of p-TPPS4.

EXAMPLE 2

Preparation of o-TPPS4

Tetra-(2-sulfanatophenyl)-porphine (designated o-TPPS4) was prepared by the following reaction. A mixture of 5 g of pyrrole, 15.5 g of the sodium salt of 2-formyl benzene sulfonic acid and 150 ml of acetic acid were added to a 250 ml round bottom flask fitted with a condenser and magnetic stirrer bar. The mixture was heated and refluxed for one hour. The mixture was then chilled in an ice bath. 10.1 g of a red/brown solid was filtered and collected. The yield was about 55%.

TLC showed the desired product, alone with a minor amount of impurity in the form of a linear oligomer.

EXAMPLE 3

Preparation of o-TPPS4

Tetra-(2-sulfanatophenyl)-porphine (designated o-TPPS4) was prepared by the following reaction. A mixture of 5 g of pyrrole, 15.5 g of the sodium salt of 2-formyl benzene sulfonic acid and 150 ml of acetic acid were added to a 250 ml round bottom flask fitted with a condenser and magnetic stirrer bar. The mixture was heated and refluxed for one hour. The hot mixture was filtered and washed with hot fresh solvent to yield 8.5 g of a red/brown solid. The yield was about 44%.

TLC showed a clean product with no impurities.

EXAMPLE 4

Preparation of o-CuTPPS4 Colorant Stabilizer

Cu-meso-tetra-(2-sulfanatophenyl)-porphine (designated o-CuTPPS4) was prepared by the following reaction. A mixture of 0.31 g of copper, 5 g of o-TPPS4 from Example 3 and 50 ml of water were added to a 250 ml round bottom flask fitted with a condenser and magnetic stirrer bar. The mixture was heated and refluxed for three hours. The hot mixture was evaporated down to about 10 ml and chilled. Acetone was added to the mixture. A precipitate was filtered and washed with hexane and toluene. The precipitate was dried under vacuum to yield 3.9 g of a solid. The yield was about 72%.

TLC showed a clean product.

EXAMPLE 5

Preparation of o-TPPS4

Tetra-(2-sulfanatophenyl)-porphine (designated o-TPPS4) was prepared by the following reaction.

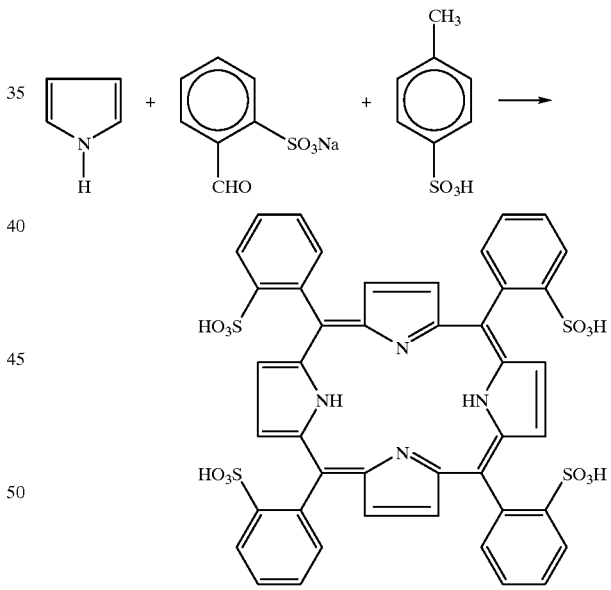

Prior to mixing the reactants, pyrrole was distilled under an argon atmosphere with the fraction boiling at 140° C. collected. The 2-formylbenzene sulfonic acid, sodium salt (Aldrich) was purified by a Dean and Stark method using benzene as the solvent. The solution was filtered at 60° C. and the resulting solid was pumped in a vacuum oven overnight at room-temperature. The DMF (99.9% anhydrous grade available from Aldrich) was used without further purification. The p-toluenesulfonic acid was purified by a Dean and Stark method using benzene as the solvent.

A mixture of 5.0 g of the pyrrole, 15.6 g of the 2-formylbenzenesulfonic acid, sodium salt, and 200 ml of the DMF were placed into a 500 ml three-necked, round-bottom flask fitted with a magnetic stir bar, condenser, thermometer, and argon gas bubbler inlet. The reaction mixture was flushed with argon for five minutes with stirring prior to heating. The mixture was then heated to 100° C. for about 10–12 minutes at which time 0.76 g of p-toluenesulfonic acid was syringed into the reaction mixture. The p-toluenesulfonic acid was dissolved in 15 ml of DMF. The clear, colorless reaction mixture turned red to blood red to brown red to red black in one to two minutes. The reaction mixture was heated to 150° C. and held at this temperature for about 50 minutes. Aliquots were removed from the reaction mixture to monitor the mixture by UV spectroscopy.

The UV spectroscopy indicated a first reaction product absorbing at a wavelength of 504 nm. On continued heating at 150° C., a porphine peak at 413 nm continued to grow with a corresponding decrease in the reaction product peak at 504 nm. After about 50 minutes at 150° C., the reaction was cooled in an ice bath for about 20 minutes. The reaction mixture, having a temperature of about 40° C., was poured into 1000 ml of benzene in a two-liter beaker and stirred at room-temperature for about 10 minutes. The precipitate was filtered using a Buchner funnel. The wet solid was then placed in a vacuum oven overnight at ambient temperature to dry the solid. Crude yield of dry powder was found to be 21.6 g.

The dried powder was stirred in 500 ml of ethanol at room-temperature for about 30 minutes and then filtered. The wet solid was pumped in a vacuum oven for about three hours to yield 15.9 g of a finished product. The yield was about 82%.

EXAMPLE 6

Preparation of o-CuTPPS4 Colorant Stabilizer

Cu-meso-tetra-(2-sulfanatophenyl)-porphine (designated o-CuTPPS4) was prepared by the following reaction. A mixture of 0.31 g of copper, 5.0 g of o-TPPS4 from Example 5, and 50 ml of water were added to a 200 ml round-bottom flask fitted with a condenser and magnetic stirrer bar. The mixture was heated in reflux for three hours. The hot mixture was evaporated down to about 10 ml and chilled. Acetone was added to the mixture. The precipitate was filtered and washed with hexane and toluene. The precipitate was dried under vacuum to yield 3.9 g of a solid. The yield was about 72%.

TLC showed a clean product of o-CuTPPS4.

EXAMPLE 7

Preparation of a Magenta Composition Containing o-CuTPPS4 Colorant Stabilizer

A magenta ink was prepared having the following composition wherein the components are given in weight %:

|  | Red |
| --- | --- |
| DI Water | 81.49 |
| Borax | 1.90 |
| HCl (1N) | 1.57 |
| EDTA 2Na | 0.10 |
| o-CuTPPS4 | 0.50 |
| Ethylene Glycol | 5.00 |

-continued

|  | Red |
| --- | --- |
| Glycerine | 5.00 |
| GIV-GARD DXN ® | 0.20 |
| COBRATEC ® 99 | 0.10 |
| Reactive Red 187 | 2.89 |
| Acid Red 52 | 1.20 |

The ink was prepared using the following components: deionized water; borax; hydrochloric acid as a buffer/pH adjuster; EDTA or sodium salts thereof as a chelating agent; ethylene glycol and glycerine as wetting agents; GIV-GARD DXN® as a biocide; COBRATEC® 99 as a corrosion inhibitor; and Reactive Red 187 and Acid Red 52 as dyes.

The magenta composition was printed onto a photoglossy medium to produce a light-stable magenta having color gamut with an enhanced blue component.

Having thus described the invention, numerous changes and modifications thereof will be readily apparent to those having ordinary skill in the art, without departing from the spirit or scope of the invention.

What is claimed is:

1. A method of making a porphine, said method comprising:

forming a reaction mixture comprising formylbenzenesulfonic acid or a sodium salt thereof, pyrrole, and a solvent; and heating the reaction mixture to form the porphine; wherein the actual yield of the porphine is greater than about 45%.

2. The method of claim 1, wherein the reaction mixture further comprises a sulfonic acid-substituted toluene compound.

3. The method of claim 1, wherein the formylbenzenesulfonic acid comprises 2-formylbenzenesulfonic acid or 4-formylbenzenesulfonic acid.

4. The method of claim 2, wherein the substituted toluene compound is p-toluenesulfonic acid or o-toluenesulfonic acid.

5. The method of claim 2, wherein the formylbenzenesulfonic acid Arises 2-formylbenzenesulfonic acid and the substituted toluene compound is p-toluenesulfonic acid.

6. The method of claim 1, wherein the solvent is acetic acid, propanoic acid, butanoic acid, pentanoic acid, hexanoic acid, formic acid, dimethylformamide, dimethyl sulfoxide, or mixtures thereof.

7. The method of claim 1, wherein the solvent is dimethylformamide, dimethyl sulfoxide, or mixtures thereof.

8. The method of claim 1, wherein the reaction mixture is heated at about 150° C. for about one hour in an argon atmosphere.

9. The method of claim 1, wherein the porphine is further reacted with copper to produce Cu-meso-tetra-(4-sulfanatophenyl)-porphine or Cu-meso-tetra-(2-sulfanatophenyl)-porphine.

10. The method of claim 1, wherein the actual yield of the porphine is greater than about 80%.

11. The method of claim 9, wherein the actual yield of the Cu-containing porphine is greater than about 55%.

12. A method of making a porphine, said method comprising:

forming a reaction mixture of 2-formylbenzenesulfonic acid or a sodium salt thereof, pyrrole, p-toluenesulfonic acid, and a solvent;

heating the reaction mixture to form the porphine.

13. The method of claim 12, wherein the solvent is dimethylformamide.

14. A method of making a porphine, said method comprising:

forming a reaction mixture consisting essentially of formylbenzenesulfonic acid or a sodium salt thereof, pyrrole, and a solvent; and heating the reaction mixture to form the porphine; wherein the actual yield of the porphine is greater than about 45%.

15. The method of claim 14, wherein the formylbenzenesulfonic acid comprises 2-formylbenzenesulfonic acid or 4-formylbenzenesulfonic acid.

16. The method of claim 14, wherein the solvent is acetic acid, propanoic acid, butanoic acid, pentanoic acid, hexanoic acid, formic acid, dimethylformamide, dimethyl sulfoxide, or mixtures thereof.

17. The method of claim 14, wherein the solvent is dimethylformamide, dimethyl sulfoxide, or mixtures thereof.

18. The method of claim 17, wherein the solvent is dimethylformamide.

19. The method of claim 14, wherein the porphine is further reacted with copper to produce Cu-meso-tetra-(4-sulfanatophenyl)-porphine or Cu-meso-tetra-(2-sulfanatophenyl)-porphine.

20. A method of making a porphine, said method comprising:

forming a reaction mixture consisting essentially of formylbenzenesulfonic acid or a sodium salt thereof, pyrrole, a sulfonic acid-substituted toluene compound, and a solvent; and heating the reaction mixture to form the porphine.

21. The method of claim 20, wherein the formylbenzenesulfonic acid comprises 2-formylbenzenesulfonic acid or 4-formylbenzenesulfonic acid.

22. The method of claim 20, wherein the substituted toluene compound is p-toluenesulfonic acid or o-toluenesulfonic acid.

23. The method of claim 20, wherein the formylbenzenesulfonic acid comprises 2-formylbenzenesulfonic acid and the substituted toluene compound is p-toluenesulfonic acid.

24. The method of claim 20, wherein the solvent is acetic acid, propanoic acid, butanoic acid, pentanoic acid, hexanoic acid, formic acid, dimethylformamide, dimethyl sulfoxide, or mixtures thereof.

25. The method of claim 20, wherein the solvent is dimethylformamide, dimethyl sulfoxide, or mixtures thereof.

26. The method of claim 20, wherein the porphine is further reacted with copper to produce Cu-meso-tetra-(4-sulfanatophenyl)-porphine or Cu-meso-tetra-(2-sulfanatophenyl)-porphine.

27. The method of claim 20, wherein the actual yield of the porphine is greater than about 45%.

28. The method of claim 20, wherein the actual yield of the porphine is greater than about 80%.

* * * * *